US010037204B2

(12) United States Patent
Patton et al.

(10) Patent No.: US 10,037,204 B2
(45) Date of Patent: Jul. 31, 2018

(54) VERSION CONTROL OF APPLICATIONS

(71) Applicant: Delphix Corp., Menlo Park, CA (US)

(72) Inventors: Chris Patton, San Francisco, CA (US); Eric Noah Schrock, Medford, MA (US); Matthew Benjamin Amdur, Cambridge, MA (US); Zubair Khan, Santa Clara, CA (US)

(73) Assignee: Delphix Corp., Menlo Park, CA (US)

( * ) Notice: Subject to any disclaimer, the term of this patent is extended or adjusted under 35 U.S.C. 154(b) by 590 days.

(21) Appl. No.: 14/258,018

(22) Filed: Apr. 22, 2014

(65) Prior Publication Data
US 2015/0301824 A1 Oct. 22, 2015

(51) Int. Cl.
*G06F 8/71* (2018.01)
*G06F 8/70* (2018.01)
*G06F 8/65* (2018.01)
*G06F 17/30* (2006.01)

(52) U.S. Cl.
CPC ............... *G06F 8/71* (2013.01); *G06F 8/65* (2013.01); *G06F 8/70* (2013.01); *G06F 17/30* (2013.01); *G06F 17/30566* (2013.01)

(58) Field of Classification Search
CPC ..... G06F 8/65; G06F 8/70; G06F 8/71; G06F 17/30; G06F 17/30566
See application file for complete search history.

(56) References Cited

U.S. PATENT DOCUMENTS

| 5,819,292 A | 10/1998 | Hitz et al. |
| 6,112,024 A * | 8/2000 | Almond ................ G06F 8/71 707/999.202 |
| 7,107,385 B2 | 9/2006 | Rajan et al. |

(Continued)

FOREIGN PATENT DOCUMENTS

JP 2005532611 A 10/2005

OTHER PUBLICATIONS

Wu et al., "Effectively Deploying Virtual Machines on Cluster," 2009, Asia-Pacific Services Computing Conference, pp. 271-276, downloaded from <url>:http://ieeexplore.ieee.org/stamp/stamp.jsp?tp=&arnumber=4780687.*

(Continued)

*Primary Examiner* — Thuy Dao
*Assistant Examiner* — Stephen Berman
(74) *Attorney, Agent, or Firm* — Fenwick & West LLP

(57) ABSTRACT

An application development system allows developers of a software system to manage infrastructure resources during the development and testing process. The application development system allows users to define application containers that comprise components including source code, binaries, and virtual databases used for the application. An application container can be associated with policies that control various aspects of the actions taken using the application container including constraints and access control. The application development system enforces the policies for actions taken by users for the application containers. The encapsulation of policies with the application containers allows users of the application containers to take actions including creating virtual databases, provisioning virtual databases, and the like without requiring system administrators to manage resource issues.

26 Claims, 6 Drawing Sheets

(56) References Cited

U.S. PATENT DOCUMENTS

| | | | |
|---|---|---|---|
| 7,174,363 B1 * | 2/2007 | Goldstein | G06F 9/546 709/203 |
| 7,225,204 B2 | 5/2007 | Manley et al. | |
| 7,322,030 B1 * | 1/2008 | Boodro | G06F 8/36 717/170 |
| 7,334,094 B2 | 2/2008 | Fair | |
| 7,334,095 B1 | 2/2008 | Fair et al. | |
| 7,340,461 B2 | 3/2008 | Vishlitzky et al. | |
| 7,373,364 B1 | 5/2008 | Chapman | |
| 7,386,695 B2 | 6/2008 | Fuente | |
| 7,409,511 B2 | 8/2008 | Edwards et al. | |
| 7,457,982 B2 | 11/2008 | Rajan | |
| 7,539,836 B1 | 5/2009 | Klinkner | |
| 7,587,563 B1 | 9/2009 | Teterin et al. | |
| 7,590,660 B1 | 9/2009 | Richards et al. | |
| 7,631,021 B2 | 12/2009 | Sarma et al. | |
| 7,743,035 B2 | 6/2010 | Chen et al. | |
| 7,757,056 B1 | 7/2010 | Fair | |
| 7,822,758 B1 | 10/2010 | Prakash et al. | |
| 7,827,366 B1 | 11/2010 | Nadathur et al. | |
| 7,856,424 B2 | 12/2010 | Cisler et al. | |
| 7,877,357 B1 | 1/2011 | Wu et al. | |
| 7,937,547 B2 | 5/2011 | Liu et al. | |
| 7,941,470 B2 | 5/2011 | Le et al. | |
| 7,996,636 B1 | 8/2011 | Prakash et al. | |
| 8,037,032 B2 | 10/2011 | Pershin et al. | |
| 8,150,808 B2 | 4/2012 | Zha et al. | |
| 8,280,858 B2 | 10/2012 | Ahrens et al. | |
| 8,311,988 B2 | 11/2012 | Cisler et al. | |
| 8,532,973 B1 | 9/2013 | CaraDonna et al. | |
| 8,775,663 B1 | 7/2014 | Singh | |
| 8,825,817 B1 * | 9/2014 | Jaisinghani | H04L 41/0816 709/221 |
| 8,966,464 B1 * | 2/2015 | Christopher | G06F 11/0712 717/166 |
| 2002/0083037 A1 | 6/2002 | Lewis et al. | |
| 2006/0095435 A1 * | 5/2006 | Johnson | G06F 8/71 |
| 2007/0226678 A1 * | 9/2007 | Li | G06Q 10/10 717/101 |
| 2007/0294215 A1 * | 12/2007 | Boss | G06F 17/30566 |
| 2008/0307345 A1 | 12/2008 | Hart et al. | |
| 2009/0217185 A1 * | 8/2009 | Goldfarb | G06F 8/71 715/763 |
| 2009/0222496 A1 | 9/2009 | Liu et al. | |
| 2009/0319534 A1 * | 12/2009 | Gokhale | G06F 17/30 |
| 2010/0077380 A1 * | 3/2010 | Baker | G06F 8/72 717/120 |
| 2010/0153917 A1 * | 6/2010 | Kramer | G06F 8/71 717/121 |
| 2011/0010701 A1 * | 1/2011 | Cooper | G06F 21/12 717/175 |
| 2011/0093435 A1 * | 4/2011 | Zha | G06F 17/30566 707/639 |
| 2011/0282863 A1 * | 11/2011 | Cohen | G06F 17/30566 707/711 |
| 2012/0096425 A1 | 4/2012 | Gupta et al. | |
| 2013/0298183 A1 * | 11/2013 | McGrath | G06F 9/455 726/1 |
| 2014/0047413 A1 | 2/2014 | Sheive et al. | |
| 2017/0249141 A1 * | 8/2017 | Parees | G06F 8/70 |
| 2017/0329588 A1 * | 11/2017 | Lundberg | G06F 8/70 |

OTHER PUBLICATIONS

Gupta et al., "Virtual database technology," 2002, 14th International Conference on Data Engineering, pp. 297-301, downloaded from <url>:http://ieeexplore.ieee.org/stamp/stamp.jsp?tp=&arnumber=655791.*

Wada et al., "Virtualization Technology for Ubiquitous Databases," 2010, pp. 555-560, downloaded from <url>:http://ieeexplore.ieee.org/stamp/stamp.jsp?tp=&arnumber=5447476.*

Boppana, U., "Using FlexClone to Clone Files and LUNs," NetApp Technical Report, Mar. 2010, 32 Pages.

Creek, T., "Applications for Writeable LUNs and LUN Cloning in Oracle Environments," NetApp, Technical Report, Jun. 2003, 10 Pages.

Degwekar, A., "Using SnapMirror with SnapDrive for UNIX," NetApp Technical Report, 2007, 11 Pages.

GMANE, Discussion regarding "File level snapshots in ZFS," From the zfs-discuss@opensolaris.org mailing list, Mar. 30, 2007, 1 Page, Can be retrieved at <URL:http://article.gmane.org/gmane.os.solaris.openolaris.zfs/7759/match=snapshot>.

GMANE, Discussion regarding "ZFS Clone Promotion [PSARC/2006/303 Timeout: May 12, 2006]," From the zfs-discuss@opensolaris.org mailing list, May 9, 2006, 2 Pages, Can be retrieved at <URL:http://article.gmane.org/gmane.os.solaris.opensolaris.zfs/194/match=clone>.

GMANE, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/224/match=cloning>.

GMANE, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/229/match=zfs+clone+promotion>.

GMANE, Discussion regarding "ZFS snapshot improvement," From the zfs-discuss@opensolaris.org mailing list, May 10, 2006, 1 Page, Can be retrieved at <URL:http://article.gmane.org/gmane.os.solaris.openolaris.zfs/232/match=snapshot>.

GMANE, Discussion regarding "ZFS promotions," From the zfs-discuss@opensolaris.org mailing list, Dec. 12, 2008, 2 Pages, Can be retrieved at <URL:http://article.gmane.org/gmane.os.solaris.openolaris.zfs/22347/match=clone>.

Higgins, B., et al., "Backup and Recovery Snap Manager for SQL Server," DLA PIPER, Nov. 2008, 37 Pages.

Hitz, D., et al., "File System Design for an NFS File Server Appliance," Technical Report, USENIX, Winter 1994, 23 Pages.

Jackson, J., "ZSF: The future for storage networks?; File system has massive capacity, but licensing issues and architectural concerns persist," Government Computer News, Media, Inc., Jun. 25, 2007, 2 Pages.

Kay, D., "Working with ZFS Snapshots," Solaris 10 How-To Guides, Version 1.0, Sun Microsystems, Inc., Jan. 5, 2009, 8 Pages.

Kilvansky, M., "A Thorough Introduction to FlexClone Volumes," NetApp, Technical White Paper, Oct. 2004, 35 Pages.

Lal, J., et al., "DB2: Cloning a Database using NetApp FlexClone Technology," NetApp, Apr. 30, 2006, 60 Pages.

Merrill, J., et al., "SnapVault Best Pratices Guide," NetApp Technical Report, 2008, 29 Pages.

Nadgir, N., "Databases and ZFS," Oracle Blog, Sep. 25, 2006, 8 Pages, Can be retrieved from <URL:https://blog.oracle.com/realneel/entry/zfs_and_databases>.

Network Appliance, Inc., "Data ONTAP 7.2 Commands: Manual Page Reference, vol. 1," May 16, 2008, 615 Pages.

Network Appliance, Inc., "NetApp Data Management for Decision Support Systems," 2005-2010, 4 Pages.

Network Appliance, Inc., "Flexvol and Flexclone Software," 2006, 2 Pages.

Network Appliance, Inc., "SnapManager 3.0 for Oracle Installation and Administration Guide," Nov. 2008, 294 Pages.

Network Appliance, Inc., "SnapManager 2.2 for Oracle Installation and Administration Guide," Nov. 2007, 310 Pages.

Network Appliance, Inc., "SnapManager 5.0 for Microsoft SQL Server Installation and Administration Guide," Oct. 2008, 492 Pages.

Network Appliance, Inc., "Network Appliance Snapmirror Software," 2006, 2 Pages.

Oracle, "Oracle Database Backup and Recovery User's Guide," 11g Release 1(11.1), Aug. 2008, 598 Pages.

Osuna, A., "An Introduction to FlexClone Volumes" Redbooks, IBM, 2006, 50 Pages.

Osuna, A., "Using IBM DB2 UDB with IBM System Storage N series" Redbooks, IBM, Dec. 2006, 136 Pages.

(56) References Cited

OTHER PUBLICATIONS

Osuna, A., "Data Protection Strategies in IBM System Storage N Series" Redbooks, IBM, Jun. 2008, 90 Pages.
Osuna, A., "IBM System Storage N Series SnapMirror" Redbooks, IBM, Jul. 2006, 124 Pages.
Osuna, A., "IBM System Storage N Series SnapVault Best Practices Guide" Redbooks, IBM, 2007, 54 Pages.
Patel, D., et al., "Rapid Database Development and Deployment," NetApp White Paper, Mar. 2007, 11 Pages.
Patterson, H., et al., "SnapMirror: File System Based Asynchronous Mirroring for Disaster Recovery," USENIX Association, Proceedings of the FAST 2002 Conference on File and Storage Technologies, Jan. 28-30, 2002, 14 Pages.
Sadagopan, P., et al., "Oracle Fusion Middleware DR Solution Using NetApp Storage," NetApp Technical Report, May 2008, 38 Pages.
Schuettinger, S., "NetApp Technical Report—Rapid Deployment of Oracle Database 11g Using VMWare Infrastructure and NetApp Flexclone," NetApp, Jan. 2008, 24 Pages.
Schuettinger, S., "Helping DBAs Become More Efficient NetApp Efficiency and Manageability Advantages," NetApp White Paper, Jul. 2009, 12 Pages.
Sun Microsystems, Inc., "ZFS the File System of the Future," 19 Pages. [Publication date is unknown].
Sun Microsystems, Inc., "Solaris ZFS Administration Guide," Aug. 2006, 164 Pages.
Sun Microsystems, Inc., "Solaris ZFS Administration Guide," Mar. 2009, 292 Pages.
Sun Microsystems, Inc., "System Administration Guide: Virtualization Using the Solaris Operating System," Oct. 2009, 562 Pages.
Syncsort Incorporated, "Near-Instant Oracle Cloning with Syncsort AdvancedClient Technologies," Synscort, White Paper, 2007, 12 Pages.
Syncsort Incorporated, "Syncsort Backup Express Advanced Recovery for NetApp," Synscort, 2008, 12 Pages.
Watanabe, S., "Solaris 10 ZFS Essentials," Sun Microsystems, 2010, 146 Pages.
Wikipedia, "ZFS," Last Modified Jul. 22, 2014, 14 Pages.
"ZFS Snapshot and Amazon S3 (Part 2 of 2)," Paul's Blog 3.0 (Release Candidate), Oracle, 2007, 5 Pages.
Final Written Decision, Before the Patent Trial and Appeal Board of United States Patent and Trademark Office, Case IPR2015-00034, U.S. Pat. No. 8,150,808 B2, Apr. 16, 2016, 100 Pages.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 8.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 61.
Final Written Decision, Before the Patent Trial and Appeal Board of United States Patent and Trademark Office, Case IPR2015-00016 & IPR2015-00019, U.S. Pat. No. 8,150,808 B2, Apr. 13, 2016, 107 Pages.
Final Written Decision, Before the Patent Trial and Appeal Board of United States Patent and Trademark Office, Case IPR2015-00014, U.S. Pat. No. 8,150,808 B2, Apr. 13, 2016, 92 Pages.
Final Written Decision, Before the Patent Trial and Appeal Board of United States Patent and Trademark Office, Case IPR2015-00025 & IPR2015-00026, U.S. Pat. No. 8,161,077 B2, Apr. 12, 2016, 94 Pages.
Final Written Decision, Before the Patent Trial and Appeal Board of United States Patent and Trademark Office, Case IPR2015-00052, U.S. Pat. No. 8,548,944 B2, Mar. 31, 2016, 25 Pages.
Final Written Decision, Before the Patent Trial and Appeal Board of United States Patent and Trademark Office, Case IPR2015-00050, U.S. Pat. No. 8,548,944 B2, Mar. 31, 2016, 26 Pages.
Final Written Decision, Before the Patent Trial and Appeal Board of United States Patent and Trademark Office, Case IPR2015-00108, U.S. Pat. No. 8,566,361 B2, Apr. 29, 2016, 61 Pages.
Final Written Decision, Before the Patent Trial and Appeal Board of United States Patent and Trademark Office, Case IPR2015-00108, U.S. Pat. No. 8,566,361 B2, May 11, 2016, 57 Pages.
Notice of Grounds for Rejection for Japanese Patent Application No. P2014-155597, dated Apr. 21, 2015, 5 Pages.
Kakinoki, T., et al., "Query Language for Enterprise Data Integration in SaaS Environment," Institute of Electronics, Information and Communication Engineers, Data Engineering Workshop Collected Papers No. 19, (DEWS 2008 C3-1), Japan, The Institute of Electronics, Information and Communication Engineers, Data Engineering Research Committee, Apr. 7, 2008, 4 Pages. (With English Abstract).
PCT International Search Report and Written Opinion for PCT/US15/19402, dated Jun. 24, 2015, 11 Pages.
Chapman et al., "SnapMirror® Best Practices Guide, NetApp, Inc. Technical Report TR-3446," Apr. 2006, 63 Pages.
Edwards, et al., "FlexVol: Flexible, Efficient File Volume Virtualization in WAFL," Jun. 22, 2008, 22 Pages.
IBM, "IBM System Storage San Volume Controller Software V4.3.0 introduces space-efficient VDisks and VDisk mirroring," IBM United States Announcement 208-114, May 13, 2008, 17 Pages.
Microsoft, Microsoft Developer's Network, "Pages and Extents," Microsoft Corporation ("Pages and Extents") Sep. 2007, 2 Pages.
Mullins, "Excerpts of DB2 Developer's Guide, Fifth Ed." May 2004, 5 Pages.
NetApp, 2007 NetApp, Inc., Data ONTAP 7.1 Data Protection Online Backup and Recovery Guide, NetApp Technical Doc, Jan. 12, 2007, pp. 508.
NetApp, "Datasheet FlexClone," NetApp Technical Doc, 2008, 2 Pages.
NetApp, "Datasheet FlexVol™ and FlexClone™ Software," NetApp Technical Doc, 2004, 2 Pages.
NetApp, "Datasheet Netapp SnapManager for Oracle," NetApp Technical Doc, 2008, 2 Pages.
NetApp, "Datasheet NetApp SnapMirror," NetApp Technical Doc, 2008, 2 Pages.
NetApp, "Datasheet NetApp Snapshot Technology," NetApp Technical Doc, 2004, 1 Page.
Ranganathan, A., and Neto, A., "Technical Report, SnapManager 3.0 for Oracle Best Practices, TR-3761" Apr. 2009, 88 Pages.
Sun Microsystems, Inc., "ZFS The File System of the Future," Apr. 27, 2009, 19 Pages.
Tate, J., et al., "Implementing the IBM System Storage SAN Volume Controller V4.3," IBM Redbook SG24-6423-06, Oct. 2008, 970 Pages.
VMware, Inc. and EMC Corporation, "Accelerate Oracle Database log Creation and Deployment Using VMware Infrastructure and EMC Celerra Writeable Checkpoints," Mar. 2008, 16 Pages.
VMware, Inc. and IBM "Using IBM® TotalStorage® Enterprise Storage Server® FlashCopy® Function with the VMware ESX 2.5 Server ("ESX IBM")," Sep. 1, 2005, 25 Pages.
VMware, Inc., "Using Clones to Streamline Development ("Ws5 Clones")," 2005, 9 Pages.
VMware, Inc., "Using VMware Infrastructure for Backup and Restore ("Esx3")," 2006, 20 Pages.
VMware, Inc., "Workstation 5 User's Manual ("WS5 Manual")," 2006, 492 Pages.
Declaration of Erez Zadok in Support of Petition for Inter Partes Review of U.S. Pat. No. 8,161,077, Oct. 6, 2014, 87 Pages.
Declaration of Erez Zadok in Support of Petition for Inter Partes Review of U.S. Pat. No. 8,161,077, Oct. 6, 2014, 95 Pages.
Declaration of Erez Zadok in Support of Petition for Inter Partes Review of U.S. Pat. No. 8,468,174, Oct. 23, 2014, 98 Pages.
Declaration of Erez Zadok in Support of Petition for Inter Partes Review of U.S. Pat. No. 8,468,174, Oct. 23, 2014, 99 Pages.
Declaration of Erez Zadok in Support of Petition for Inter Partes Review of U.S. Pat. No. 8,566,361, Oct. 21, 2014, 99 Pages.
Declaration of Erez Zadok in Support of Petition for Inter Partes Review of U.S. Pat. No. 8,566,361, Oct. 21, 2014, 84 Pages.
Declaration of Erez Zadok in Support of Petition for Inter Partes Review of U.S. Pat. No. 8,150,808, Oct. 2, 2014, 85 Pages.

(56) References Cited

OTHER PUBLICATIONS

Declaration of Erez Zadok in Support of Petition for Inter Partes Review of U.S. Pat. No. 8,150,808, Oct. 2, 2014, 78 Pages.
Declaration of Erez Zadok in Support of Petition for Inter Partes Review of U.S. Pat. No. 8,150,808, Oct. 2, 2014, 84 Pages.
Declaration of Erez Zadok in Support of Petition for Inter Partes Review of U.S. Pat. No. 8,150,808, Oct. 6, 2014, 97 Pages.
Declaration of Erez Zadok in Support of Petition for Inter Partes Review of U.S. Pat. No. 8,548,944, Oct. 7, 2014, 98 Pages.
Declaration of Erez Zadok in Support of Petition for Inter Partes Review of U.S. Pat. No. 8,548,944, Oct. 8, 2014, 98 Pages.
Petition for Inter Partes Review of U.S. Pat. No. 8,161,077, Oct. 6, 2014, 62 Pages.
Petition for Inter Partes Review of U.S. Pat. No. 8,161,077, Oct. 6, 2014, 65 Pages.
Petition for Inter Partes Review of U.S. Pat. No. 8,468,174, Oct. 23, 2014, 64 Pages.
Petition for Inter Partes Review of U.S. Pat. No. 8,566,361, Oct. 21, 2014, 66 Pages.
Petition for Inter Partes Review of U.S. Pat. No. 8,150,808, Oct. 3, 2014, 65 Pages.
Petition for Inter Partes Review of U.S. Pat. No. 8,150,808, Oct. 3, 2014, 61 Pages.
Petition for Inter Partes Review of U.S. Pat. No. 8,150,808, Oct. 7, 2014, 65 Pages.
Petition for Inter Partes Review of U.S. Pat. No. 8,548,944, Oct. 8, 2014, 66 Pages.
Petition for Inter Partes Review of U.S. Pat. No. 8,548,944, Oct. 8, 2014, 65 Pages.

* cited by examiner

VERSION CONTROL OF APPLICATIONS

BACKGROUND

This invention relates generally to version control and in particular to version control of applications comprised of one or more data stores.

Software applications developed for use by an enterprise or for other purposes are typically comprised of multiple data stores. These data stores comprise information related to the application. As an application developer builds the application, the application developer makes changes to the source code in concert with the underlying data. Developers typically use source code management tools to branch, share, refresh, and rollback changes to application source code to work efficiently across multiple tasks and teams. However, these tools do not provide similar functionality for the associated data stores. These data stores require allocation of resources that are typically handled by people specializing in infrastructure management. Application developers typically don't have the knowledge or authorization required to manage these resources. For example, if an application developer needs the latest version of the data associated with an application, the developer must interact with an infrastructure management person to orchestrate a backup and restore of the data. As a result, any attempt to change the current data version requires time and resource intensive interactions, requiring the developers to wait. This causes delays in the application development process. If a developer attempts to work around these delays by using stale or incorrect data application quality may be compromised, resulting in further delays. Conventional techniques have shortcomings in the way resources are managed to support multiple versions of an application across a development team.

SUMMARY

Embodiments allow version control for applications. An application development system stores a set of application containers. Each application container comprises information describing components of the application, for example, data stores for use by the application, and policies associated with the application container. An example of a policy is a policy specifying constraints for a data store of the application container. The application development system receives a request to perform an action associated with development of the application using an application container. The application development system performs the requested action in conformance with the policies of the application container. For example, the application development system verifies whether the requested action violates a constraint on usage of the data store specified by a policy The features and advantages described in this summary and the following detailed description are not all-inclusive. Many additional features and advantages will be apparent to one of ordinary skill in the art in view of the drawings, specification, and claims.

Figure 1:
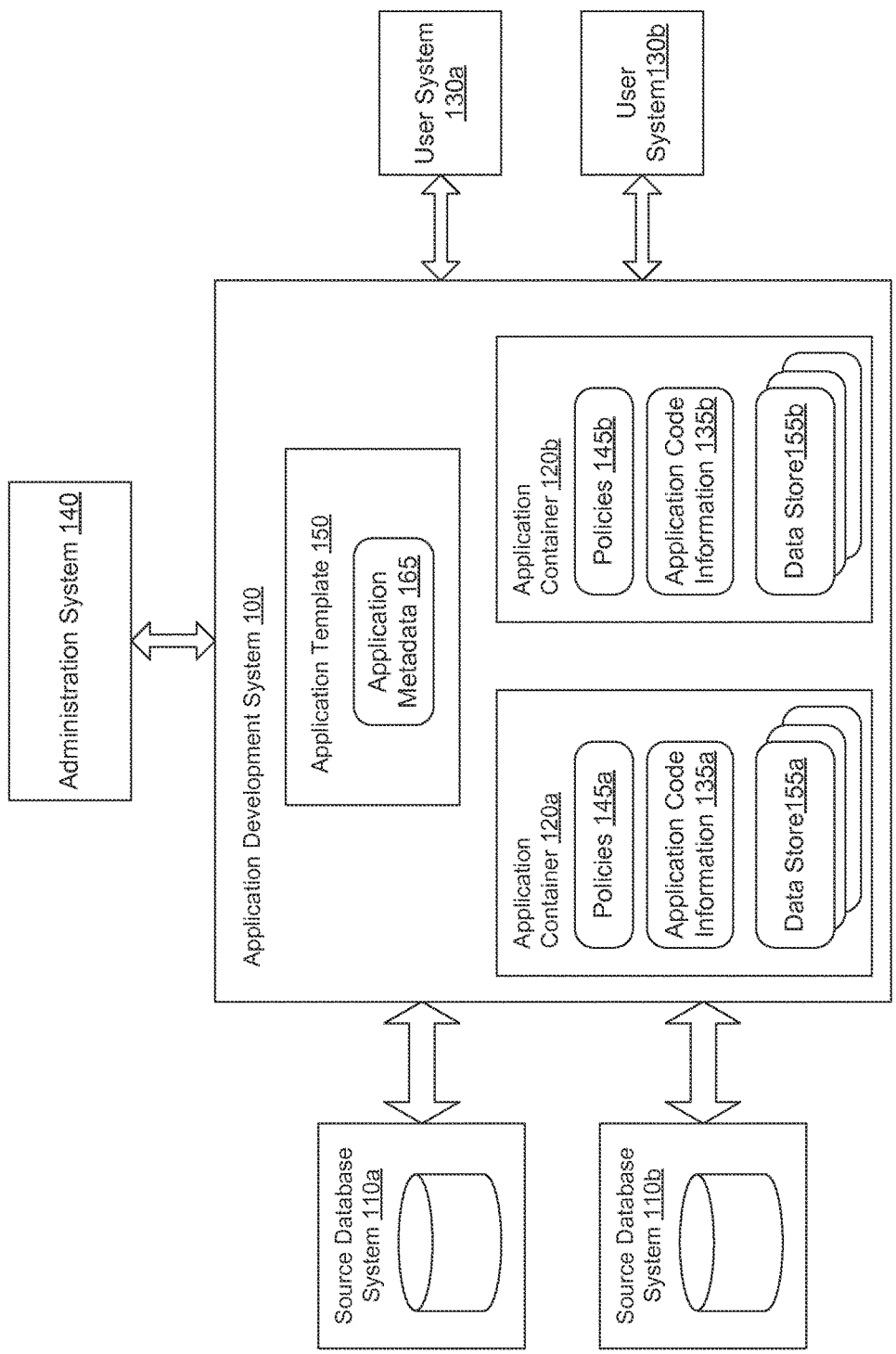
FIG. 1 is diagram illustrating the overall system environment for performing version control of applications, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Development of an application requires a developer to interact with several components associated with the application being developed, for example, source code, libraries used for application development, the application development environment, databases used by the application and so on. During development, a developer requests an application development system to perform various actions related to these components associated with the application. For example, the developer may request the application development system to import certain data to the database, rollback the database to a previous state, and so on. A developer may not be able to perform these operations without knowledge of the information technology (IT) infrastructure. For example, the developer may not have permission to create a new database or the developer may not have permission to access the database that the developer needs data from. Management of resources for application development requires IT infrastructure management personnel who are familiar with resource management issues, for example, number of servers available, number of database licenses available, and so on.

Embodiments allow version control of applications that use one or more data stores. According to an embodiment, an application development system stores an application template for developing an application. The application template comprises metadata describing various components used for the application. An application template also represents a description of the resources used by the application. A user, for example, a system administrator can create an application container based on an application template through a provisioning process. The application container created is assigned the required resources as specified by the application template. An application container can host data corresponding to a point-in-time associated with the corresponding application template. An application container can also host data corresponding to a point-in-time associated with another application container based on the application template. The application container comprises one or more data stores, branches created during application development, and policies that manage resource consumption. An example of a data store is a virtual database.

The application development system receives requests to perform actions using the application container. The requested actions are associated with development of the application. For example an action may comprise refreshing the data within the current application container, creating a new branch within the application container, sharing data with other users, and so on. The application development system performs the requested action in conformance with the policies of the container. For example, the application development system verifies whether the requested action violates a resource constraint on usage of the virtual databases specified by a policy. In an embodiment, the resource constraint specifies one or more permissions associated with a user and the application development system verifies whether the user is allowed to perform a requested action based on the one or more permissions specified. As another example, the application development system checks whether a requesting user has permission to operate on an object. The application development system allows or denies the operation based on the permissions of the requesting user. The application container abstracts the physical resources required to support the data stores for the application, for example, virtual databases. This insulates developers from details concerning IT infrastructure relevant to maintaining resources. Furthermore, IT personnel can make IT infrastructure changes without involving application developers in the process.

The application development system treats the set of federated data stores for an application template or application container as a single entity. Accordingly, an operation requested for an application template or an application container is translated to a set of operations, one for each federated data store. For example, if an application container includes a set of virtual databases, the application development system performs a refresh operation on the application container by performing a refresh operation on each virtual database of the application container. Similarly, the application development system performs a reset operation on the application container by performing a reset operation on each virtual database of the container.

As another example, the requested action comprises creating a bookmark for an application container. The bookmark identifies a point in time within a branch. The application development system maps the information describing the bookmark to corresponding information describing the individual data stores of the application container. A bookmark may identify an event associated with the application container, for example, a stage in the software development cycle. The application development system maps the event to specific points in time for each data store of the application container. The application development system records the name and properties of the bookmark, along with policies that control whether the bookmark is shared with other users that have been assigned containers within the template. When the bookmark is created, the application development system identifies the data blocks required by the points in time copies corresponding to the bookmark and keeps them available as long as the bookmark exists.

In another embodiment, the requested action comprises creating a new branch corresponding to a point in time. The point in time may be specified explicitly or by identifying a bookmark. If the requested action specifies a bookmark, the application development system takes the requested bookmark, and identifies the virtual databases required to make available a consistent copy of the data at that point in time across the federated data sets within the application. The application development system identifies the data represented by the bookmark and creates a new space efficient copy for each virtual database. This branch tracks data version changes within the container while it is active.

Overall System Environment

FIG. 1 is diagram illustrating the overall system environment for performing version control of applications, in accordance with an embodiment of the invention. As shown in FIG. 1, the overall system environment includes an application development system 100, one or more source database systems 110, user system 130, and an administration system 140. (A letter after a reference numeral, such as "130a," indicates that the text refers specifically to the element having that particular reference numeral, while a reference numeral in the text without a following letter, such as "130," refers to any or all of the elements in the figures bearing that reference numeral.)

A user system 130 refers to a computer system, for example, a client device used by a user, for example, an application developer, quality assurance person, or any user involved in the application development activity. The administration system 140 refers to a computer system, for example, a client device used by a system administrator. Typically a system administrator is a privileged user who is authorized to perform certain tasks that and application developer may not be authorized to perform. The administration system 140 is used for system administrator tasks including managing information technology (IT) infrastructure, for example, ensuring that certain tasks or users are not using more than a threshold amount of system resources. The administration system 140 can also be used for determining access control for users, for example, allowing certain users to access particular resources or disabling access to certain users for particular resources.

The application development system 100 comprises modules that allow user systems 130 to perform activities related to application development, for example, making changes to source code, executing source code, testing, performing backup and restore, creating branches, and so on. Applications developed using the application developer system 100 typically store and access data stored in database stores that comprise virtual databases (VDBs). Virtual databases are further described herein.

The application development system 100 maintains application templates 150 that store metadata describing various components used by applications. The various components of an application template 150 include metadata describing source code, for example, location of files storing source code, information identifying a version of the source code or versions of individual source code files, and so on. In an embodiment, the application template 150 includes information identifying source code managed by an external source code management system. In other embodiments, the application development system 100 stores the source code locally and the application template includes location of the source code within the application development system 100. The application template 150 also stores metadata describing data stores used by the application, for example, metadata describing virtual data bases and source databases used by the application.

The application development system 100 maintains application containers 120 that are instantiated from application templates 150. A user, for example, a system administrator can create an application container 120 from an application template 150 using a provisioning process. The application container 120 created is assigned the required resources as specified by the application template. An application container 120 can host data corresponding to a point-in-time associated with the corresponding application template 150.

An application container can also host data corresponding to a point-in-time associated with another application container 120 based on the application template 150.

The application container 120 comprises information associated with an application being developed. As shown in FIG. 1, an application container 120 includes source code information 135, data stores 155, and policies 145. An application container 120 may include other components not illustrated in FIG. 1. The source code information 135 includes information describing source code and binary code for the application. The information describing the source code may include information identifying source code stored in an external source code management system. Alternatively, the source code may be stored locally within the application development system 100 and the information describing the source code includes the location of the source code in the application development system 100. The source code comprises code being developed by application developers and/or tested by quality assurance persons. The binary code includes libraries used by the source code. The data stores 155 store application data used by the application. For example, the application may store and access data in a VDB. Each application container 120 may include one or more data stores 155. The application container may include information describing (or files storing information describing), application configuration, workflow information, and so on.

The policies 145 comprise information that is typically provided by a system administrator but may also be provided by a user, for example, a developer or tester. A policy 145 is also referred to as an administrative policy. A policy governs various aspects of actions associated with an application container. For example, a policy governs relations between an application container and IT infrastructure resources and users. A policy may specify schedules for actions associated with an application container. For example, a policy may specify schedule of how data associated with an application container is refreshed. A policy may specify access control for an application container, for example, information describing users that have access to various resources associated with the application container, types of actions allowed for specific users, types of resources that may be used for executing an application container including servers, storage resources, network resources, processing resources, and so on. Depending on the policies specified for application containers, the application development system 100 may provide a user, access to a particular resource for a given application container but may not have provide access to the same user for the same resource for another application container. For example, the application development system 100 may allow the user to provision a virtual database on a particular server for development of a particular application using an application container but may not allow the same user to provision a virtual database for development of another application using another application container. Accordingly, the application development system 100 can enforce different policies and different constraints for the same user for development of different applications depending on the application containers. In an embodiment, a constraint is a resource constraint associated with components of the application container. A resource constraint may be a constraint on the hardware resource used by the user and specify the amount of computing resources that can be used by a user. For example, a resource constraint may specify an upper bound on the amount of memory usage for a user. A resource constraint may specify constraints on usage of various components of an application container.

For example, a resource constraint may specify whether a user has access to a particular virtual database of the application container, whether a user is allowed to execute a particular type of action such as creating a new virtual database, creating a branch for the application container, resetting the state of a virtual database of the application container, checking out or checking in certain source code associated with the application container, executing certain type of workflow associated with the application container, and so on.

In an embodiment, a system administrator or any user with appropriate privileges specifies various policies for an application template 150 or application container 120. A user uses the application container 120 for performing various actions associated with a software development life cycle including software development, testing, release, and so on. The application development system 100 checks whether requests for actions using the application containers received from users conform to the policies set by the system administrator. For example, the application development system 100 ensures that the resources used by the user of an application container 120 conform to any policies 145 associated with the application container and actions performed by the users with the application container conform to any access control policies set for the application container.

The ability to encapsulate policies within an application container allows a developer to perform actions associated with an application container 120 without requiring help from a system administrator or IT infrastructure management persons. For example, a user may be granted the access control to provision VDBs on a server for the application container in advance by a system administrator when the application container is created. During the software development life cycle, the user can provision the VDBs on the server without requiring the system administrator to provision the VDBs on the user's behalf. However, the user may not be able to provision VDBs on other servers. This makes the overall process of software development efficient.

Provision or creation of a virtual database is a much simpler and efficient process compared to corresponding operations on a conventional database. For example, a VDB takes significantly less time to create and occupies much less storage compared to a conventional database. The simplicity of virtual databases compared to a conventional database provides the ability to encapsulate several administrative tasks within an application container, thereby allowing an end user to perform the tasks without requiring assistance from a system administrator.

In an embodiment, client devices corresponding to administration system 140 or user system 130 are computing devices that execute client software, e.g., a web browser or built-in client application, to interact with the application development system 100 via a network. Note that the terms "client" or "client device," as used herein may refer to software providing respective functionality, to hardware on which the software executes, or to the entities operating the software and/or hardware, as is apparent from the context in which the terms are used. For example, a client device may execute software development tools that interact with a database system.

In one embodiment, the client device can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device can be any device having computer functionality, such as a personal digital assistant (PDA), mobile telephone, smartphone, etc. In an embodiment, a client of the database system can be another process, for example, a web server that serves queries from remote devices.

The interactions between the client devices and the application development system 100 are typically performed via a network, for example, via the internet. The network enables communications between the client device and the application development system 100. In one embodiment, the network uses standard communications technologies and/or protocols. In another embodiment, the entities can use custom and/or dedicated data communications technologies instead of, or in addition to, the ones described above. Depending upon the embodiment, the network can also include links to other networks such as the Internet.

Architecture of Application Templates and Application Containers

Figure 2A:
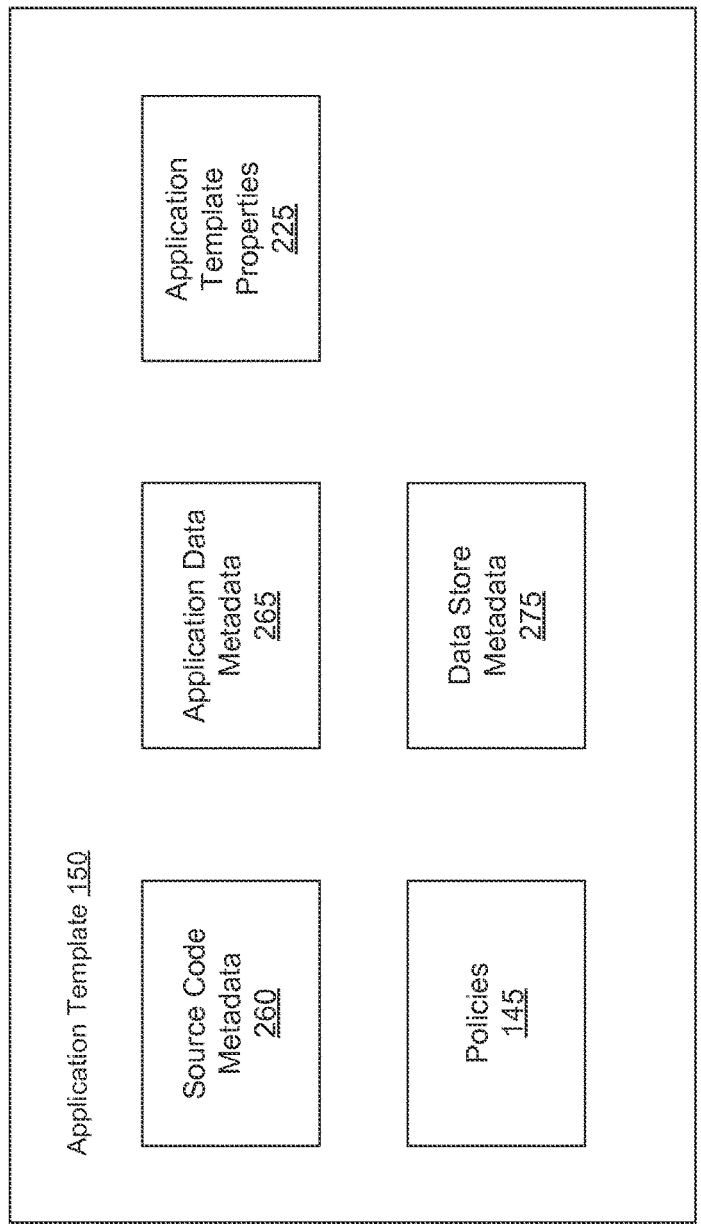
FIG. 2A is diagram illustrating the architecture of an application template for performing version control of applications, in accordance with an embodiment of the invention.

FIG. 2A is diagram illustrating the architecture of an application template for performing version control of applications, in accordance with an embodiment of the invention. The application template 150 includes metadata for various components used by application containers 120. The application template includes source code metadata 260, application data metadata 265, policies 145, application template properties 225, and data store metadata 275. Other components not illustrated may be included in an application template 150. Furthermore, a particular application template may not include all components shown in FIG. 2A.

The data store metadata 275 comprises metadata for various data stores used by the application associated with the application template. These include metadata describing one or more VDBs used by the application and one or more source databases used for populating data for the VDBs. The data stores are identified by a name. The data store metadata 275 may include text description of the data stores and properties storing key value pairs describing the data stores.

The application data metadata 265 describes data used by the application, for example, binary data such as a library used by the source code, or other types of data including text, images, or media used by the application. The application data metadata 265 specifies information including the name, version, and location in the file system for the application data used by the application. The source code metadata 260 describes source code used by the application. The source code may be stored in an external source code control system. The source code metadata 260 includes information including name and location in a file system of files storing source code being developed for the application.

The application template 150 stores policies associated with management of application containers 120 instantiated from the application template 150. A policy defined in the application template 150 is shared by all application containers 120 instantiated from the application template. Policies defined in the application template 150 may act as default policies for use in the application container. Application containers 120 may define their own policies 145 that are applicable to that specific application container. The policies of the application container 120 may be in addition to any policy defined in the application template 150 or may override a default policy defined in the application template 150.

Application template properties 225 are key value pairs that are stored in an application template 150. The application template properties 225 are provided by the application template 150 to application containers 120 instantiated from the application template 150. Application template properties 225 store information that can be used for filtering and aggregating information describing various containers. For example, an application template property 225 may identify a project for which the application container 120 was created for. A system administrator may search for all application containers 120 for a given project using the property.

An application template 150 further includes a name and description. The name of the application template 150 uniquely identifies the application template 150. The description of the application template 150 is text describing the application template 150 for developers using the application template 150. The description of the application template 150 is included in an application container 120 instantiated from the application template 150.

Figure 2B:
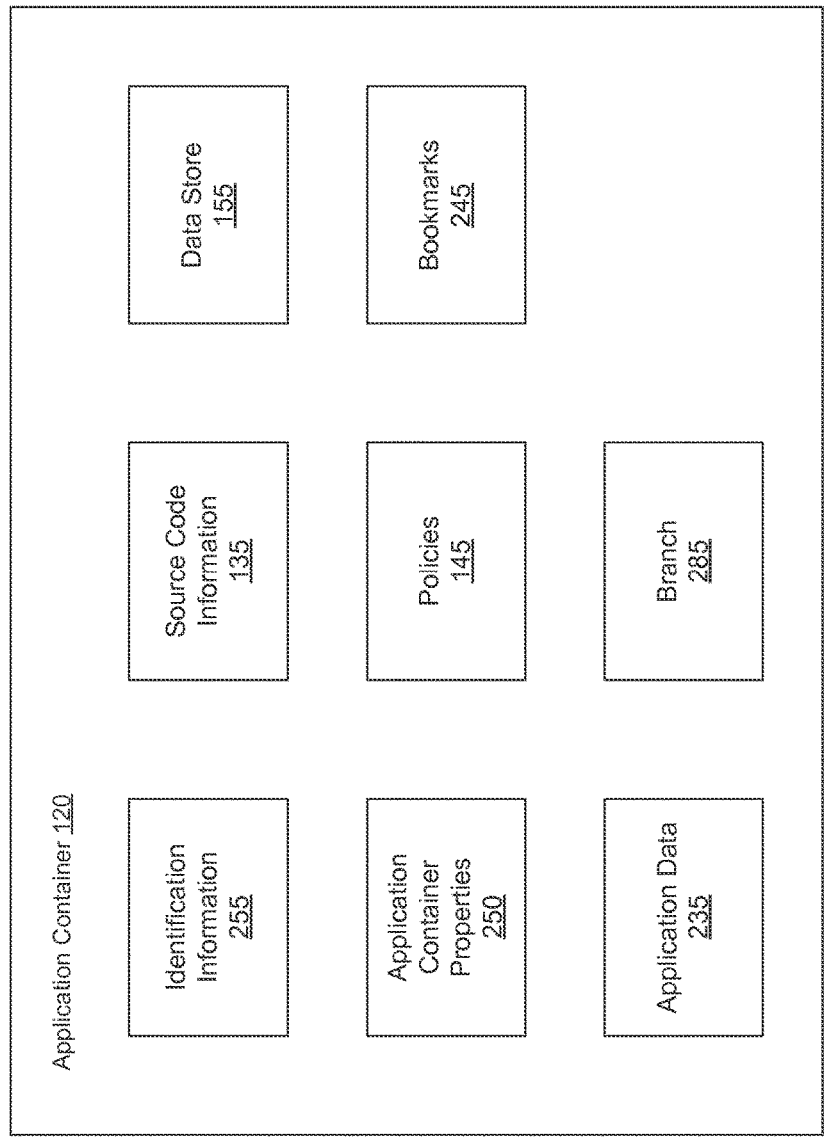
FIG. 2B is diagram illustrating the architecture of an application container for performing version control of applications, in accordance with an embodiment of the invention.

FIG. 2B is diagram illustrating the architecture of an application container 150 for performing version control of applications, in accordance with an embodiment of the invention. The application container 150 comprises identification information 255, source code information 135, data stores 155, application container properties 250, policies 145, application data 235, and bookmarks 245. In some embodiments, an application container may include additional components or fewer components. Furthermore, a functionality of a component may be implemented by other components than those described herein.

The identification 255 information uniquely identifies each application container. The identification information 255 may include a name for each application container. The name may be assigned by a user, for example, a system administrator or by a developer or a quality assurance person. The identification information 255 may include a description of the application container. The description of the application container is provided by a user, for example, a system administrator and may include any information relevant to the application container, for example, the purpose for which the application container is being used.

The application container 120 includes application specific information for example, source code information 135 and data stores 155. The application development system 100 may receive application specific information from a user, for example, an application developer. The source code information 135 represents information describing the source code of the application associated with the application container. In an embodiment, the information describing the source code identifies source code stored in an external system, for example, a source code control system. In other embodiment, the application development system 100 stores the source code files locally and information describing the source code includes location of the source code within the application development system. The data underlying source code information 135 may be shared across application containers 120.

An application container 120 may include one or more data stores 155. A data store 155 can be a virtual database. The virtual databases stores data used by the application associated with the application container. Virtual databases store data efficiently, for example, a virtual database may share database blocks with other virtual databases if the corresponding data of the two VDBs is identical. The application development system 100 can refresh database blocks of a VDB using a source database.

The application container 120 may include different types of application data. The application data 235 comprises data used by the application, for example, for example, media files, text files, and so on. The application data 235 also includes binary code used by the application, for example, libraries used by the application.

A policy may specify access control limitations of the application container. For example, a policy may specify the types of users or sets of users that are allowed to access certain VDBs of the application container. A policy may specify the types of actions that a user is allowed to perform. For example, users of a particular type may be allowed to perform certain types of actions. The policy may specify the types of actions that are allowed to a set of users or individual users.

The application container properties 250 store information that can be used to customize each application container. An application container property may be represented as a key value pair. The application container properties 250 store information that applies to the application container instead of information that applies to specific components of an application container, for example, the data sources. For example, a property may be used to store information describing the source code used to create the application container. Example of information describing the source code is a hash code associated with the source code used to identify a version of the source code.

A bookmark 245 represents a state of an application container corresponding to a point-in-time. The state of an application container corresponding to a point-in-time corresponds to the state of each data store 155 of the application container corresponding to the point-in-time. However, a bookmark 245 may correspond to a different point-in-time for each data source of the application container. For example, a bookmark 245 may represent completion of a stage of a project. However, different data stores 155 of the application container 120 may reach completion for that stage of the project at different points in time. The differences in the points of time of different data stores 155 of an application container 120 for a bookmark 245 may also result from the fact that different data stores 155 may reach a consistent state at different points in time.

For example, as changes are made to the application container 120, the application container 120 may reach a particular state that a user may bookmark. An application container may be bookmarked at different points in time. As a result, an application container may be associated with a list of bookmarks 245. The application development system 100 may present the list of bookmarks 245 to a user for performing certain operations related to application containers 120. For example, if a user wants to rewind the state of the application container to a previous point in time, the application development system 100 presents the list of bookmarks of the application container to the user. The application development system 100 receives a selection of one of the bookmarks 245 of the application container 120 from the user and rewinds the application container 120 to the state corresponding to the selected bookmark 245. The application development system 100 can create a bookmark 245 on an application container 120 as well as an application template 150.

A bookmark 245 may have a number of properties including a name, a branch for which the bookmark was created, the application template 150 or application container 120 for which the bookmark 245 was created, a user that created the bookmark 245, a description of the bookmark 245, and properties represented as key value pairs. The application development system 100 can receive a request from a user to share a bookmark 245 with another user. The application development system 100 shares the bookmark with the other user in response to the request. The application development system 100 can share a bookmark 245 to be accessible to all application containers 120 instantiated from the same application template 150.

A branch 285 represents a sequence of changes made to an application container 120 and is associated with a timeline along which changes to the application container 120 are received. The sequence of changes may be associated with a project or a particular task for which the application container 120 is being used. For example, a branch may be associated with all the changes for a particular point release of a software. Alternatively, a branch may be created for fixing a specific bug and comprises the sequence of changes related to the bug fix.

An application container can have multiple branches 285. A branch 285 is active if the user can perform actions using the data corresponding to the branch, for example, by performing actions that modify information associated with the branch 285. An application container 120 can have only one active branch 285. The remaining branches 285 that the user is not performing actions with are inactive branches. A branch 285 can be mapped to a set of timeflows associated with the data stores 155 of the application container 120. The application development system 100 stores all changes made to data stores 155 of an application container 120 along a time line. These changes correspond to a particular timeflow of the application container 120. The user may request the application container 120 to be reset (or rollback) to a previous point-in-time so as to start a new set of changes associated with a new timeflow. Accordingly, the same branch of an application container 120 may be associated with multiple timeflows. The changes to a VDB associated with a timeflow are stored as changed blocks for the VDB. Other application data of the application container may also be stored using changed blocks, such that blocks that do not change are shared across various points in time. Timeflows are described in Provisional Application 61/844,376 filed on Jul. 9, 2013, entitled "Virtual Database Rewind," which is incorporated by reference in its entirety.

Virtual Database Systems

An application container 120 may include one or more virtual databases for storing data processed by the application being developed. The VDBs are created based on the state of a source database or another VDB at a particular point in time. The application development system 100 copies information from the source database to a storage system at various points in time. The application development system 100 manages the data from the source databases in an efficient manner such that database blocks that are unchanged across two or more point-in-time copies are shared by these point-in-time copies.

To create a VDB, the application development system 100 creates files that represent the information corresponding to the source database system 110 at a given point in time. The application development system 100 provides access to the created files to a user system 130 using a file sharing system. The user system 130 runs a server that can operate with the files exposed by the application development system 100. Hence, a virtual copy of the source database is created for the user system 130 for a given point in time in a storage efficient manner. A database block may be shared between different VDBs. In particular, a database block is shared by VDBs if the user systems 130 using the VDBs only perform read operations on the database block. However, if a user system 130 attempts to write to the database block, a separate copy of the database block is made because the writing operation causes that database block to be different for the VDB corresponding to that user system 130 than it is for the other VDBs.

Virtual databases allow various operations for users of VDBs, for example, the ability refresh a VDB, reset the state of a VDB to a previous state, copy a VDB, and so on. Virtual database systems are described in U.S. patent application Ser. No. 12/603,541 filed on Oct. 21, 2009, now issued as U.S. Pat. No. 8,150,808, which is incorporated by reference herein in its entirety.

System Architecture of an Application Development System

Figure 3:
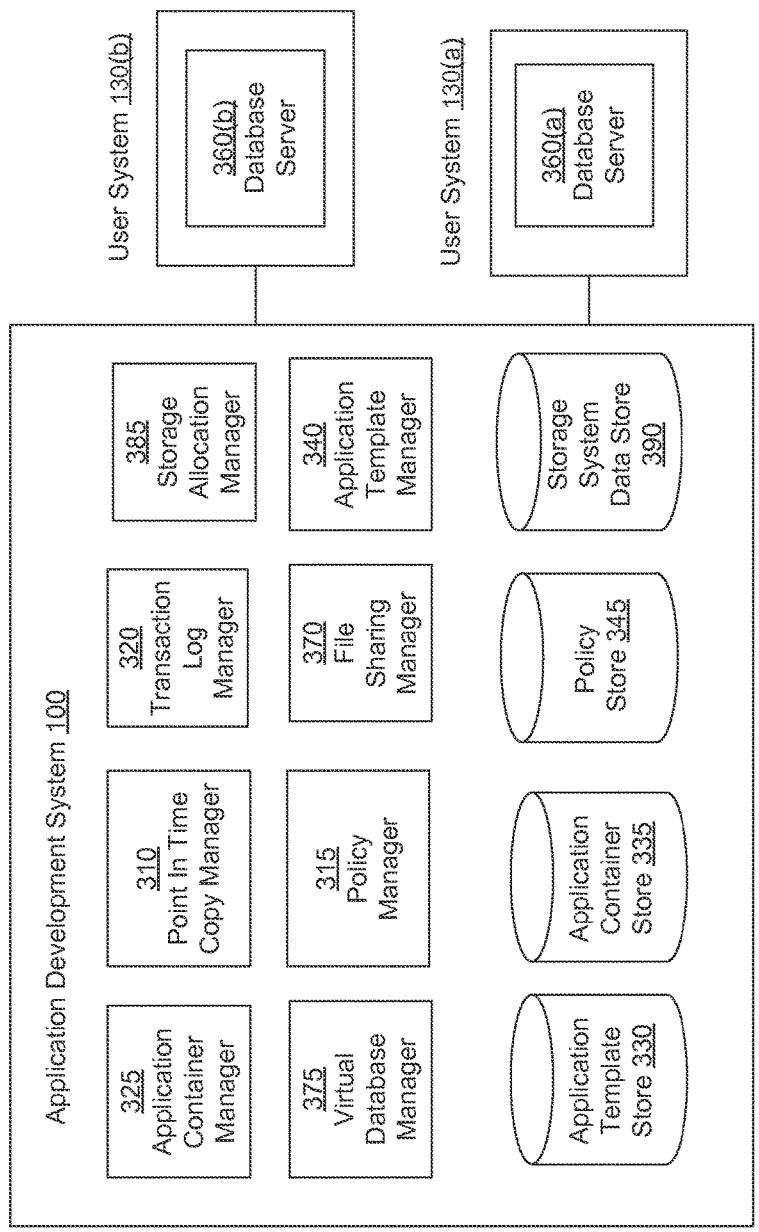
FIG. 3 shows a high level block diagram illustrating system environment architecture of an application development system, in accordance with an embodiment.

FIG. 3 shows a high level block diagram illustrating the system architecture of an application development system, in accordance with an embodiment. The overall system environment comprises an application development system 100, and one or more user systems 130. The application development system 100 retrieves information available in the source database systems 110 and stores it. The information retrieved from the source database includes database blocks comprising data stored in the database, transaction log information, metadata information related to the database, information related to users of the database and the like. The application development system 100 provides access to the data stored in the application development system 100 to a user system 130 allowing the user system 130 to treat the data as a copy of the source database. Systems shown in FIG. 3 communicate with each other if necessary via a network. FIG. 3 does not illustrate other systems that may be used, for example, a source database system 110 or a system administration system 140.

A user system 130 includes a database server 360. The database server 360 is a computer program that provides database services and application programming interfaces (APIs) for managing data stored on a data store. The data managed by the database server 360 may be stored on the storage system data store 390 that is shared by the application development system 100 with the user system 130 using a file sharing system. In alternative configurations, different and/or additional modules can be included in a user system 130.

The application development system 100 includes a point-in-time copy manager 310, a transaction log manager 320, a storage allocation manager 385, a file sharing manager 370, a virtual database manager 375, application container manager 325, policy manager 315, application container store 335, application template manager 340, application template store 330, a policy store 345, and a storage system data store 390. In alternative configurations, different and/or additional modules can be included in the application development system 100. Functionality described herein can be performed by other modules than the one's described herein.

The point-in-time copy manager 310 interacts with the source database system 110 by sending a request to the source database to retrieve information representing a point-in-time copy (also referred to as a "PIT copy" or a snapshot) of the source database. The point-in-time copy manager 310 stores the data obtained from the source database system 110 in the storage system data store 390. The data retrieved by the point-in-time copy manager 310 corresponds to database blocks (or pages) of the database being copied from the source database. After a first PIT copy request to retrieve information source database, a subsequent PIT copy request retrieves data that changed in the source database since the previous request or the previous PIT copy was sent by the source database system.

The transaction log manager 320 sends request to the source database system 110 for retrieving portions of the transaction logs stored in the source database system 110. The database blocks retrieved by a point in time copy manager 310 combined with the transaction logs retrieved by the transaction log manager 320 are used to reconstruct a copy of a database in the source database system 110 corresponding to times in the past in between the times as which point-in-time copies are made.

The file sharing manager 370 allows files stored in the storage system data store 390 to be shared across computers that may be connected with the application development system 100 over the network. Sharing a file stored in the storage system data store 390 using the file sharing manager 370 allows a remote computer, for example, the user systems 130 to access the data in the shared file.

The application container store 335 stores application containers in the application development system 100. The application template store 330 stores application templates. The policy store 345 stores policies in the application development system 100. A policy may be represented as a markup language document, for example, an XML document. Alternatively, a policy may be represented using the syntax of a proprietary language. A policy that restricts creation of VDBs for an application container on specific hosts is implemented as a mapping from application container identifiers to host names. A policy that limits the types of actions performed by users is implemented as a mapping from information identifying sets of users to types of actions. A set of user may be represented by listing individual users or by specifying an attribute describing the user. For example, a set of users may be specified as all users belonging to a particular department or engineering team.

The application template manager 340 implements various operations performed using an application template. For example, the application template manager 340 creates an application container using an application template. The application template manager 340 also performs creation of application templates, deletion of application templates, and modifications of application templates.

An application container manager 325 implements various operations performed using an application container. These operations include creating a new application container, editing an existing application container, deleting an application container, creating a new application container from an application template, creating or deleting a bookmark, creating a branch, resetting an application container, refreshing an application container and so on. Details of various operations allowed on an application container are further described herein.

The policy manager 315 manages and enforces the policies stored in the policy store 345. The policy manager 315 implements various operations associated with policies including creating a new policy, editing an existing policy, deleting an existing policy and the like. Furthermore, the application container manager 325 invokes the policy manager 315 to ensure that the policies are enforced. For example, if the application container manager 325 is creating a new VDB for an application container, the application container manager 325 sends a request to the policy manager 315 to ensure that all relevant policies are enforced. The policy manager 315 identifies the various policies relevant to the creation of the VDB and enforces them. For example, if there are access control policies relevant to the user that invoked the create operation, the policy manager 315 verifies whether the user has the permission to create the new VDB for the application container. The policy manager 315 may verify whether the user has access to the host specified for creating the VDB. The policy manager 315 may verify if the user is exceeding predefined limits on the number of VDBs that the user is allowed to create or if a set of users that the user belongs to exceeds a limit of the number of VDBs that the set of users is allowed to create.

In an embodiment, policy manager 315 receives requests to define policies from a database administrator, creates policies according to the requests, and stores the created policies in the policy store 345. The policies may be associated with various operations associated with the loading of point-in-time copies from source database systems 110, loading of transaction logs from the source database systems 110, purging of information from the application development system 100 including point-in-time copies of databases and transaction log information, provisioning of virtual database systems, and replication of data from the database storage system to remote database storage system. A policy may specify rules associated with execution of a specific operation. For example, a policy may specify that an operation must be executed based on a predetermined schedule. A policy may specify when to purge PIT copies stored in the application development system 100 based on number of PIT copies that have been accumulated for a source database. A policy may measure storage availability to determine when to purge information. For example, if the amount of storage available reaches below a threshold level, old PIT copies of selected databases may be purged. The policy may also specify priority of source databases to be used before purging information, for example, low priority database information should be purged before purging high-priority database information. In a particular workflow scenario, a policy may determine when to obtain new information from a source database and automatically update VDB information and provision the updated VDB based on the new information.

The virtual database manager 375 manages VDBs. The virtual database manager 375 receives and processes requests for creation of VDBs for a user system 130. The request for creation of a virtual database may be sent by a database administrator using the administration system 140 and identifies a source database system 110, a user system 130, and includes a past point-in-time corresponding to which a virtual database needs to be created. The virtual database manager 375 creates the files corresponding to the virtual database being created and shares the files with the user system 130 using the file sharing manager 370. The database administrator for a user system 130 may be different from a database administrator for the source database system 110.

The storage allocation manager 385 provides the functionality of storing data retrieved from the source database system 110. The storage allocation manager 385 keeps track of the various versions of each block of data that may be obtained from the source database system 110. The storage allocation manager 385 stores data in an efficient manner for a point-in-time copy such that database blocks that do not change since a previous point-in-time copy was received are shared across the point-in-time copies. Accordingly, only the database blocks that changed since a previous point-in-time copy was received are stored for a subsequent point-in-time copy. For a given time point, the storage allocation manager 385 can be requested to provide the latest version of a block of data obtained before the given time point.

Figure 4:
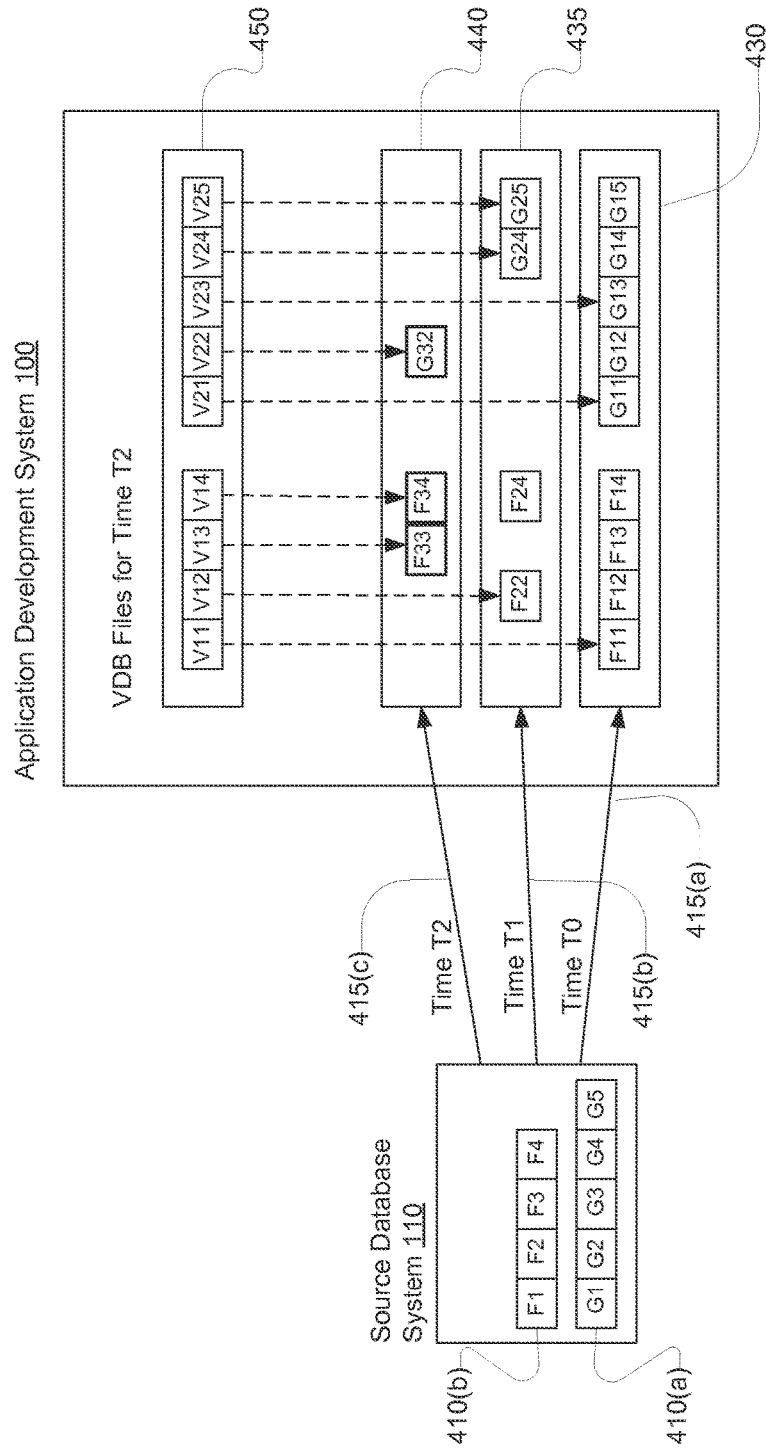
FIG. 4 illustrates a structure of data stored in a virtual database, in accordance with an embodiment.

FIG. 4 indicates how the application development system 100 maintains storage efficient copies to create a read/write file structure representing a VDB. As shown in FIG. 4, the structures 410 represent the files corresponding to a database on the source database system 110. The structures Fi and Gi represent database blocks stored in the files 410 respectively (Fi refers to F1, F2, F3, . . . and similarly Gi refers to G1, G2, G3, . . . ). The arrows 415 represent the process of making PIT copies at different time points Ti. The first PIT copy 430 made at time T0 needs to copy all the necessary database blocks of the database. For example, F1$i$ represents a copy of block Fi and block G1$i$ represents a copy of block Gi. The PIT copy 435 made at time Ti copies only the blocks that changed since the last PIT copy and may copy much less data compared to the first PIT copy. Similarly at time T2 another PIT copy 440 is made copying the database blocks that changed since the previous PIT copy 435.

Assuming the PIT copy 440 is the last PIT copy made for the configuration shown in FIG. 4, the VDB file structures 450 are created for time point T2. When the structure 450 are created, the blocks V11, V12, . . . , V25 may be implemented as pointers to the actual database block that stores the data. For example, V11 represents the information in block F and since the block F1 was never updated during copies made at time Ti and T2, V11 points at F11. V12 represents the information in block F2 and since F2 was updated at time T1, V12 points at the block F22. Similarly, V13 corresponds to block F3 that was updated at time T2 and points at the block F33.

Overall Process

Figure 5:
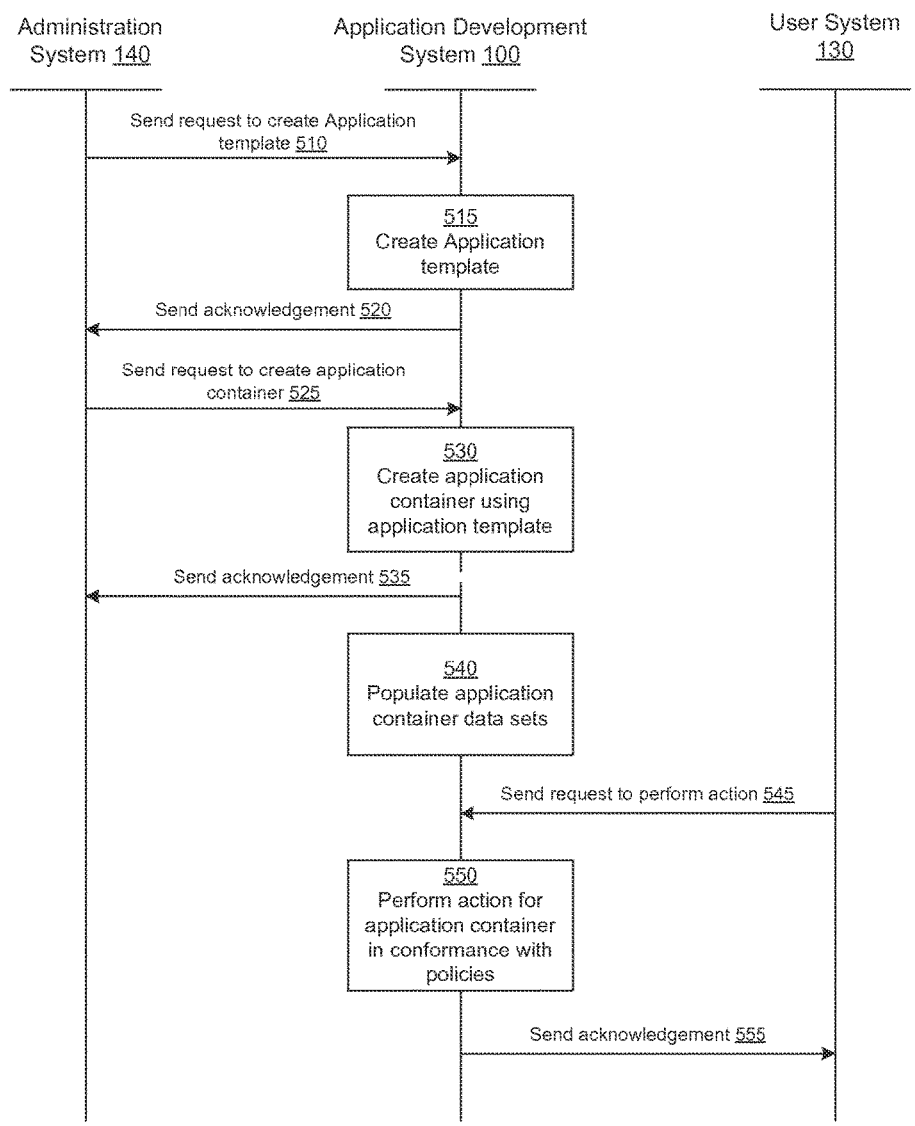
FIG. 5 shows an interaction diagram illustrating how an administration system, the application development system, and a user system interact to manage and use application templates and application containers, in accordance with an embodiment.

FIG. 5 shows an interaction diagram illustrating how the administration system 140, the application development system 100, and the user system 130 interact to manage and use application containers 120, in accordance with an embodiment. Typically, a system administrator or a privileged user interacts with the administration system 140. An end user, for example, a developer or tester interacts with the user system 130. However, the techniques described herein are not limited to any particular type of user or the type of software or application being developed using the system. For example, the system disclosed can be used for developing system software, server side applications/systems, client side applications/system, stand alone systems, and so on.

The administration system 140 sends 510 a request to create an application template 150 to the application template manager 340 of the application development system 100. In some embodiments, the user system 130 may send a request to create an application template to the application template manager 340, provided the user sending the request from the user system 130 has the privilege to create an application template 150. The application template manager 340 of the application development system 100 creates 515 the application template 150 based on the request.

The application development system 100 may receive information for creating 515 the application template 150 via an interactive process. For example, the application development system 100 may prompt the user to provide relevant information using a user interface. The application development system 100 receives the information from the administration system 140. The application development system 100 receives identification information 255 including the name and description of the application template 150 to be created. Subsequently, the application development system 100 receives information describing the data stores 155 used by the application template 150. The application development system 100 further receives information describing any source code information 135 and properties 250 for the application template 150.

The application development system 100 also receives policies 145 applicable to the application template 150 from the administration system 140. The policies 145 may be predefined policies available in the policy store 345. For example, certain policies may be shared across application templates 150 and application containers 120. Alternatively the user of the administration system 140 may define policies specifically for an application template 150.

The administration system 140 sends 525 requests to create an application container 120 from the application template 150 created. In some embodiments, the request to create the application container 120 may be sent by a user system 130, assuming the user of the user system has appropriate privileges to create an application container 120 from an application template 150.

The application development system 100 populates 540 data of the data stores 155 of the application container 120 created. The request to create the application container 120 may specify a particular bookmark 245 for determining the state of the application container 120 being created. The application development system 100 determines the state of the various data stores 155 for the application container 120 corresponding to the bookmark 245 and populates the data of the data stores 155 based on the determined states. The application container manager 325 of the application development system 100 creates various components of the application container based on the application template, for example, properties, policies, etc. if these are specified by the application template 150.

Once the application container 120 is created, the user system 130 sends 545 requests to the application development system 100 to perform actions using the application container 120. The actions may correspond to refreshing a VDB of the application container, resetting the state of the application container 120, or any other operation supported by the application development system 100. The application development system 100 performs 550 the requested action and sends 555 an acknowledgement to the user system 130 indicating whether the action was performed successfully. There may be several actions performed by the user and accordingly steps 545, 550, and 555 repeated. Furthermore, several user systems 130 may interact with the same application container. Actions requested by administration system 140 may be interleaved with actions performed by user systems 130. For example, during a software release, a system administrator may update the policies associated with an application container 120. Various types of operations that can be performed using an application container 120 are further described.

The application container manager 325 performs several operations on an application container 120 by performing a corresponding operation on each of the data stores 155 of the application container 120. This is so because the application container 120 encapsulates a set of data stores 155. The state of the application container 120 corresponds to the state of each of the individual data store 155 of the application container. Accordingly, the application container manager 325 performs operations that change the state of the application container 120 by changing the states of each of the individual data store 155 encapsulated by the application container 120.

Managing Bookmarks

An application container manager 325 is configured to create a bookmark 245 for an application container 120 by providing a name for the bookmark and a point-in-time for which the bookmark needs to be created. The bookmark 245 may be associated with a particular event in the software development life cycle. For example, if the application being developed has reached a certain stage of development, the user may bookmark the application container 120. Examples of bookmarks 245 for an application container 120 include a bookmark indicating an alpha release, a bookmark indicating a beta release, a bookmark indicating a release with particular bug fixes, a bookmark indicating a release provided to quality assurance for testing, and so on. A bookmark 245 is associated with a particular state of all the components of the application container 120. For example, the bookmark 245 is associated with a particular state of the source code information 135 and application data 235 for the application container. The bookmark is also associated with a particular state of the data stores 155. For example, the bookmark may be associated with a particular state of the VDBs of an application container 120. Accordingly, the bookmark is associated with a particular set of database blocks of the virtual databases.

A bookmark 245 may be associated with a particular point in time or a set of points in time. For example, if multiple developers are using the application container, each developer may reach the final state corresponding to the bookmark at different points in time. This may happen, for example, if the development based on one VDB is finished ahead of the development based on a another VDB. Accordingly, two different virtual databases of the application container may be associated with database blocks from two different points in time even though they are associated with the same bookmark.

To enable the user to move an application container 120 back and forward to any time point, the application development system 100 stores and saves all snapshots and transaction log files (of VDB updates and modifications between snapshots) associated with each VDB of the application container 120. This information is referred to as a timeflow of the application container 120. Each VDB of the application container is also associated with a timeflow. The application container manager 325 maps time points in the timeflow of the application container 120 with points in the timeflow of the individual VDBs of the application container 120. The application container manager 325 also maps time points in the timeflow to states of the components of the application container 120 that may not be stored using VDBs, for example, source code information 135 and application data 235. The states of these components may be stored by storing a copy of the underlying information corresponding to that time point.

To reset the application container 120 to a state corresponding to a bookmark, the application container manager 325 identifies the snapshots that were obtained from the corresponding source databases for each VDB at a point in time preceding the state corresponding to the bookmark 245. The transaction log manager 320 applies the logs to the database blocks of the snapshot if necessary to reach the state corresponding to the bookmark. In an embodiment, the state of each VDB is associated with a bookmark. The bookmark for the application container 120 maps to either a bookmark of a VDB or to point in time associated the VDB.

An application container 120 that is reset to a state corresponding to a bookmark can be moved forward along the timeflow. For example, bookmarks A and B may be created at different points in time for an application container. Assume that B is more recent compared to A. The application container manager 325 can reset the application container 120 to the older bookmark A. At a later stage, the application container manager 325 may advance the state of the application container to the recent bookmark B upon request by a user.

Managing Branches

A user can create a branch 245 for an application container 120. A user can perform actions associated with branches, for example, switching between branches, creating a branch, deleting a branch, and so on. Creating a branch allows a user to make changes to the application container 120 that are isolated from other changes being made to the application container 120.

The application development system 100 tracks changes associated with a particular logical task within a branch 245. For example, a developer may need to urgently fix a bug discovered in a customer installation. The developer may request the application development system 100 to create a branch for an application container 120 for fixing the bug. The application development system 100 receives further requests for actions from the user for that particular branch. The application development system 100 isolates the changes to the components of the application made for the branch with any other branches that users may have created.

In an embodiment, the application container 120 is assumed to have a main branch that is created by default. Other branches created by developers may be named. In an embodiment, when a user creates a new branch of an application container 120 from a parent branch, a copy of the data of the application container 120 is made for the new branch. For example, source code, binary code, properties etc. of the application container 120 are copied for the new branch.

A user can also perform other operations on a branch, for example, delete a branch or switch between branches. The application development system 100 determines actions to be performed for individual components of an application container 120 corresponding to an action related to a branch of the application container 120. For example, if the application container manager 325 receives a request to change the branch of the application container 120 from a current branch to a target branch, the application container manager 325 makes all components of the target branch active, thereby providing access to the state of the components corresponding to the target branch. The application container also marks the components of the current branch as inactive so that the user is unable to access the components of the current branch. For example, the application container manager 325 provides access to the users to database blocks of VDBs corresponding to the target branch. The application container manager 325 also makes all components of the current branch inactive, thereby disallowing access to the state of the components corresponding to the current branch.

If the user sends a request to delete a branch, the application container manager 325 deletes the data associated with the branch. For example, the application container manager 325 deletes any copies of source code or binary code for the branch, and any information describing changes made to the data or metadata of the branch. In some embodiments, deleting the branch does not free the space used by the branch. However, the user cannot access the branch after the branch is deleted.

At a given point in time, users of an application container operate on a particular branch, referred to as the current branch. A user can switch between branches. For example, a user working on a first branch can request the application container manager to change the branch to a second branch. Subsequently, any modifications made by the user to the application container are applied to the second branch. The user can subsequently switch back to the first branch or to a third branch.

Managing Data of an Application Container

The application container manager 325 can perform a refresh operation on an application container 120. The refresh operation corresponds to updating the data of the data stores of the application container to a particular state. The particular state to which the application container is refreshed may be specified using a point-in-time or by using a bookmark. The application container manager 325 can refresh the application container to any point-in-time corresponding to a branch of the application container 120 or a branch of the application template 150 used to instantiate the application container 120. The application container manager 325 determines the state of each data store, for example, VDB of the application container corresponding to the point-in-time specified. The application container manager 325 performs a refresh operation on each of the data store of the application container.

The application container manager 325 can refresh the application container to the state corresponding to a shared bookmark. The application container manager 325 determines the state for each data store, for example, VDB of the application container corresponding to the bookmark specified. The application container manager 325 performs a refresh operation on each of the data store of the application container to update their state to the determined state.

As an example, the application container manager 325 may refresh an application container 120 using the latest data as specified by an application template 150 associated with the application container 120. In an embodiment, a request to refresh the application container 120 specifies refreshing the application container 120 based on a bookmark identifying a particular state of the virtual databases. The application container manager 325 identifies database blocks corresponding to a point-in-time copy of data that matches the bookmark. The application container manager 325 requests the transaction log manager 320 to identify transaction logs obtained since the point-in-time copy corresponding to the bookmark. The transaction log manager 320 updates the identified database blocks by applying the identified transaction logs. The virtual database manager 375 updates the file structure of the virtual database to point at the updated database blocks.

The application container manager 325 can perform a reset operation on an application container 120. The application container manager 325 performs a reset operation on an application container by resetting the state of the application container to a previous state identified by the request. The request may identify the previous state by identifying a bookmark, a previous refresh operation, or a previous reset operation executed by the application development system 100 for the application container. The reset operation is useful for developers and testers if they are executing code that destroys the data of the application containers or updates it to values that cannot be used subsequently. The developers or testers can request the application container manager 325 to reset the application container so that all data stores are reset to a state that can be used for further development or testing.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing." "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating virtual databases from point-in-time copies of source databases stored in a storage manager. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for application development, the method comprising:
    identifying an application template of an application development system, the application template indicating resources used by the application, the application template comprising:
        source code metadata identifying locations within a file system storing source code for the application;
        application metadata indicating one or more virtual databases used by the application;
        a set of administrative policies associated with development of the application, the one or more administrative policies governing operations that may be performed by a user associated with the development of the application on virtual databases associated with application containers created from the application template;
    creating a plurality of application containers based on the application template, each application container instantiated by provisioning to the application container a respective set of resources as specified by the application template, wherein each application container corresponds to a point in time associated with the application template, and comprises:
        application source code information identifying locations within the file system storing source code for the application corresponding to the point in time;
        one or more virtual databases provisioned by the application template configured to store application data used by the application, each virtual database constructed based upon a respective point in time associated with a corresponding data store indicated by the application template,
        a set of administrative policies for the application container associated with development of the application, the one or more administrative policies governing operations that may be performed by a user associated with the development of the application on the virtual databases of the application container,
    receiving, from the user associated with development of the application, a request to perform an action using an application container of the plurality of application containers, the action associated with development of the application; and
    performing the requested action in conformance with the administrative policies of the application container and of the application template, the performing comprising, determining whether to allow or deny the requested action.

2. The method of claim 1, wherein a virtual database of the one or more virtual databases indicated by the application metadata is a virtual database that shares database blocks with one or more other virtual databases.

3. The method of claim 1, wherein the application source code information includes information identifying source code of the application in an external source code management system.

4. The method of claim 1, wherein the application container further comprises one or more of: binary code, application configuration information, or workflow information.

5. The method of claim 1, wherein the administrative policies for the application container specify permissions for the user associated with development of the application, wherein performing the requested action comprises:
    receiving information identifying the user associated with development of the application; and determining whether the user is allowed to perform the requested action based on the specified permissions.

6. The method of claim 1, wherein the administrative policies for the application container specify actions associated with a virtual database of the application container that are allowed for a user, the requested action performing an operation on the virtual database of the application container, wherein performing the requested action comprises:
receiving information identifying the user sending the request; and
verifying whether the user is allowed to perform the requested actions on the virtual database.

7. The method of claim 1, wherein performing the requested action comprises, verifying whether the requested action violates a resource constraint associated with a virtual database of the one or more virtual databases provisioned by the application template, as specified by an administrative policy of the set of administrative policies for the application container.

8. The method of claim 1, wherein the requested action comprises refreshing an application container, the method comprising:
for each of the one or more virtual databases of the application container, updating the data of the virtual database in accordance with the request, the updating performed using database blocks obtained from a corresponding source database.

9. The method of claim 8, wherein a virtual database of the one or more virtual databases of the application container is refreshed using the latest data from a source database corresponding to the virtual database, the refreshing of the data of the virtual database comprising:
identifying database blocks corresponding to the latest point-in-time copy of data received from the source database corresponding to the virtual database;
updating the identified database blocks by applying transaction logs received from the source database to the identified database blocks; and
updating a file structure of the virtual database to point at the updated database blocks.

10. The method of claim 8, wherein the requested action specifies a bookmark identifying a particular state of the application container, the refreshing of the data of each of the virtual databases of the one or more virtual databases of the application container comprising:
identifying database blocks corresponding to a point-in-time copy of data received from a source database corresponding to the virtual database, the point-in-time copy matching the bookmark;
identifying transaction logs obtained since the point-in-time copy corresponding to the bookmark; updating the identified database blocks by applying the identified transaction logs; and
updating a file structure of the virtual database to point at the updated database blocks.

11. The method of claim 1, wherein an administrative policy of the set of administrative policies for the application container specifies a server for provisioning a virtual database of the application container, the requested action from the user associated with development of the application provisioning the virtual database, wherein performing the requested action comprises, provisioning the virtual database on the specified server.

12. The method of claim 1, wherein the application template specifies metadata describing components of application containers created from the application template.

13. The method of claim 1, further comprising:
receiving a request to create a new application container from the application template;
creating the new application container, comprising:
creating virtual databases of the new application container corresponding to the virtual databases specified in the application template;
associating virtual databases of the new application container with source databases specified in the application template; and associating administrative policies in the new application container corresponding to administrative policies specified in the application template.

14. The method of claim 13, wherein the request to create the new application container from the application template specifies a bookmark associated with a parent application container, the method further comprising:
creating file structures for the virtual databases of the new application container using database blocks associated with the state of the parent application container.

15. The method of claim 1, wherein the requested action comprises resetting a state of the application container to a previous state determined based on the request, the method comprising:
for each virtual database of the one or more virtual databases of the application container:
resetting the data of the virtual database to correspond to a point-in-time copy obtained from a corresponding source database; and
applying transaction logs to the virtual database to apply changes made in the corresponding source database.

16. The method of claim 15, wherein the previous state of the application container is specified in the request by identifying a bookmark associated with the application container.

17. The method of claim 15, wherein the previous state of the application container corresponds to a previous refresh operation performed on the application container.

18. The method of claim 15, wherein the previous state of the application container corresponds to a previous reset operation performed on the application container.

19. The method of claim 1, wherein the application container is associated with a source branch, the method further comprising:
receiving a request to change the branch of the application container to a target branch; and
marking components of the source branch as inactive and marking components of the target branch as active.

20. A computer program product comprising a non-transitory computer readable storage medium, the non-transitory computer readable storage medium storing instructions for:
identifying an application template of an application development system, the application template indicating resources used by the application, the application template comprising:
source code metadata identifying locations within a file system storing source code for the application;
application metadata indicating one or more virtual databases used by the application;
a set of administrative policies associated with development of the application, the one or more administrative policies governing operations that may be performed by a user associated with the development of the application on virtual databases associated with application containers created from the application template;
creating a plurality of application containers based on the application template, each application container instantiated by provisioning to the application container a respective set of resources as specified by the application template, wherein each application container corresponds to a point in time associated with the application template, and comprises:
application source code information identifying locations within the file system storing source code for the application corresponding to the point in time;
one or more virtual databases provisioned by the application template configured to store application data used by the application, each virtual database constructed based upon a respective point in time associated with a corresponding data store indicated by the application template,
a set of administrative policies for the application container, associated with development of the application, the one or more administrative policies governing operations that may be performed by a user associated with the development of the application on the virtual databases of the application container;
receiving, from the user associated with development of the application, a request to perform an action using an application container of the plurality of application containers, the action associated with development of the application; and
performing the requested action in conformance with the administrative policies of the application container and of the application template, the performing comprising, determining whether to allow or deny the requested action.

21. A computer-implemented system comprising: a computer processor; and a computer readable non-transitory storage medium storing instructions thereon, the instructions when executed by a processor cause the processor to perform the steps of:
identifying an application template of an application development system, the application template indicating resources used by the application, the application template comprising:
source code metadata identifying locations within a file system storing source code for the application;
application metadata indicating one or more virtual databases used by the application;
a set of administrative policies associated with development of the application, the one or more administrative policies governing operations that may be performed by a user associated with the development of the application on virtual databases associated with application containers created from the application template;
creating a plurality of application containers based on the application template, each application container instantiated by provisioning to the application container a respective set of resources as specified by the application template, wherein each application container corresponds to a point in time associated with the application template, and comprises:

application source code information identifying locations within the file system storing source code for the application corresponding to the point in time;
one or more virtual databases provisioned by the application template configured to store application data used by the application, each virtual database constructed based upon a respective point in time associated with a corresponding data store indicated by the application template,
a set of administrative policies for the application container associated with development of the application, the one or more administrative policies governing operations that may be performed by a user associated with the development of the application on the virtual databases of the application container;
receiving, from the user associated with development of the application, a request to perform an action using an application container of the plurality of application containers, the action associated with development of the application; and
performing the requested action in conformance with the administrative policies of the application container and of the application template, the performing comprising, determining whether to allow or deny the requested action.

22. The method of claim 1, wherein each administrative policy of the set administrative policies of the application template is applied to each application container associated with the application template.

23. The method of claim 1, wherein the requested action comprises refreshing the application container to a point in time corresponding to a latest data state specified by the application template associated with the application container.

24. The method of claim 1, wherein each of the plurality of application containers comprises a respective virtual database, the method further comprising:
for each of the plurality of application containers:
modifying a state of the respective virtual database to correspond to a point in time that is distinct from points in time of virtual databases of one or more other application containers from the plurality of application containers.

25. The method of claim 1, wherein each application container further comprises at least one bookmark, each bookmark indicating a state of the application container, and identifying a point in time for each of the one or more virtual databases of the application container, wherein a bookmark of the at least one bookmarks identifies a first point in time for a first data store of the application container, and a second point in time for a second data store of the application container that is different from the first point in time.

26. The method of claim 1, wherein at least one administrative policy of the application container overrides a corresponding administrative policy of the application template, and wherein the requested action is performed in conformance with the administrative policies of the application container and the administrative policies of the application template not overridden by the at least one administrative policy of the application container.

\* \* \* \* \*